(12) United States Patent
Chen (10) Patent No.: US 9,997,956 B1
(45) Date of Patent: Jun. 12, 2018

(54) SYSTEMS, APPARATUS, AND METHODS FOR AUTOMATIC GENERATION CONTROL ISLANDED OPERATION

(71) Applicant: Siemens Industry, Inc., Alpharetta, GA (US)

(72) Inventor: Dingguo Chen, Eden Prairie, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days. days.

(21) Appl. No.: 15/615,529

(22) Filed: Jun. 6, 2017

Related U.S. Application Data (60) Provisional application No. 62/462,468, filed on Feb. 23, 2017.

(51) Int. Cl.
*H02J 9/06* (2006.01)
*H02J 3/00* (2006.01)
*G05B 19/042* (2006.01)
*H02J 3/38* (2006.01)
*H02J 9/00* (2006.01)
*H02J 3/46* (2006.01)

(52) U.S. Cl.
CPC ............ *H02J 9/06* (2013.01); *G05B 19/0428* (2013.01); *H02J 3/005* (2013.01); *H02J 3/381* (2013.01); *H02J 3/46* (2013.01); *H02J 9/002* (2013.01)

(58) Field of Classification Search
None
See application file for complete search history.

(56) References Cited

U.S. PATENT DOCUMENTS

2008/0039979 A1   2/2008   Bridges et al.

FOREIGN PATENT DOCUMENTS

| CN | 104505852 A | 4/2015 |
| WO | 2015164292 | 10/2015 |
| WO | 2016172283 A1 | 10/2016 |

OTHER PUBLICATIONS

Herman B.Ross et al., "An AGC Implementation for System Islanding and Restoration Conditions", IEEE Transactions on Power Systems, vol. 9.No. 3. Aug. 1994; 1994; (12 pages).

*Primary Examiner* — Carlos Ortiz Rodriguez (57) ABSTRACT

Embodiments provide systems, apparatus, and methods for power distribution during islanding conditions. Embodiments include power generating resources operating within a control area; power consuming loads; a power transmission network coupling the resources to the loads; and an energy management system in communication with the resources and configured to control operation of the resources within the control area. The energy management system is operative to divide the control area into a plurality of isolation areas in response to detecting that isolation areas have occurred within the control area, assign at least one of the resources to each of the isolation areas, disable operation of the control area, enable each of the isolation areas to operate as an island having automatic gain control, balance a generation level and load level for each isolation area, and use load frequency control to stabilize operation of each isolation area. Numerous additional aspects are disclosed.

20 Claims, 7 Drawing Sheets

SYSTEMS, APPARATUS, AND METHODS FOR AUTOMATIC GENERATION CONTROL ISLANDED OPERATION

RELATED APPLICATION

The present application claims priority to U.S. Provisional Patent Application No. 62/462,468, filed Feb. 23, 2017, and entitled "AGC ISLANDED OPERATION" which is hereby incorporated herein by reference in its entirety for all purposes.

FIELD

The present invention relates to operating energy systems, and more specifically to automatic generation control (AGC) islanded operation of such systems.

BACKGROUND

Typically, automatic generation control (AGC) systems are designed to suspend control during emergency situations. System islanding is one such emergency situation. Conventional AGCs are specifically designed to immediately suspend control if an islanding situation is detected. An AGC attempts to detect an island by monitoring system frequency deviation and/or by comparing system frequency with the frequencies of generating units across the system. If system frequency deviates from normal, or deviates from a unit frequency, by greater than some threshold, it is an indication that, potentially, a portion of the system has been islanded and is not an integral part of the interconnection. AGC systems are typically designed to suspend control under such circumstances since AGC controlled units try to satisfy interconnected system objectives. AGC is suspended primarily to preclude dangerous and incorrect control of units. Under these conditions, some of the units may actually belong to the island so that controlling them is of no avail, in terms of meeting the interconnection obligations of the AGC function. In fact, under these circumstances, controlling islanded resources to meet the interconnection obligations of the AGC function would almost definitely result in worsening the island generation/load imbalance and island frequency deviation in a conventional system. This in turn, could result in frequency relay trips of units and loads and eventually lead to a blackout of the island in a conventional system.

Island AGC functions have been proposed that are designed to operate in parallel with the primary AGC function on-line just for the island. Such prior art systems require the operator to determine that the island exists and to identify which generators are within the island. The generators in the islanded portion are manually assigned to a second AGC function, which has the primary objective of maintaining constant frequency in the island. Thus, what is needed are improved systems, apparatus, and methods for AGC islanded operation.

SUMMARY

In some embodiments, a power distribution system using automatic generation control during islanding conditions is provided. The system includes power generating resources operating within a control area; power consuming loads; a power transmission network coupling the resources to the loads; and an energy management system in communication with the resources and configured to control operation of the resources within the control area. The energy management system is operative to divide the control area into a plurality of isolation areas in response to detecting that isolation areas have occurred within the control area, assign at least one of the resources to each of the isolation areas, disable operation of the control area, enable each of the isolation areas to operate as an island having automatic gain control, balance a generation level and load level for each isolation area, and use load frequency control to stabilize operation of each isolation area.

In some other embodiments, a power distribution method using automatic generation control during islanding conditions is provided. The method includes providing an energy management system in communication with a plurality of power generating resources operating within a control area and configured to control operation of the resources within the control area; dividing the control area into a plurality of isolation areas in response to detecting that isolation areas have occurred within the control area; assigning at least one of the resources to each of the isolation areas; disabling operation of the control area; enabling each of the isolation areas to operate as an island having automatic gain control; balancing a generation level and load level for each isolation area; and using load frequency control to stabilize operation of each isolation area.

In yet other embodiments, an energy management system using automatic generation control during islanding conditions is provided. The energy management system includes a processor in communication with a plurality of power generating resources operating within a control area and configured to control operation of the resources within the control area; a memory storing instructions executable on the processor. The instructions are operable to divide the control area into a plurality of isolation areas in response to detecting that isolation areas have occurred within the control area, assign at least one of the resources to each of the isolation areas, disable operation of the control area, enable each of the isolation areas to operate as an island having automatic gain control, balance a generation level and load level for each isolation area, and use load frequency control to stabilize operation of each isolation area.

Still other features, aspects, and advantages of embodiments will become more fully apparent from the following detailed description, the appended claims, and the accompanying drawings by illustrating a number of exemplary embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale. The description is intended to cover all modifications, equivalents, and alternatives falling within the spirit and scope of the claims.

DETAILED DESCRIPTION

Embodiments disclosed herein describe an energy management system enhanced to allow automatic generation control (AGC) operation during islanding of a power system control area. Under normal conditions, power utilities and Independent System Operators (ISO) are committed to controlling the generating assets in their control areas in various smart ways in order to meet the North American Electric Reliability Corporation (NERC) mandated CPS1 and CPS2 control performance standards, or CPS1 and BAAL (Balancing Authority ACE Limits) standards. Under abnormal conditions, such as islanding conditions, a control area may split into multiple islands. The main objective of the enhanced AGC of embodiments operating in islanded mode is to ensure that the generation control of each island is smooth and stable. The AGC includes several modules that can be enhanced to better handle islanded operation. Once the load frequency control (LFC) module stabilizes the islanded operation, the economic dispatch (ED) module, the reserve monitor (RM) module, and the production cost monitor (PCM) module can start their respective operations.

Embodiments provide improved control performance during normal operation under abnormal conditions. In addition to quickly detecting islanding conditions, embodiments are adapted to respond quickly to address such conditions, and likewise, when islanding conditions disappear, quick, smooth restoration to normal operation with advanced control (for instance, CPS based predictive control for smooth and effective control of ACE, interchange and frequency) and advanced dispatch (for instance, security constrained economic dispatch to monitor, prevent, mitigate and possibly eliminate possible transmission line overloading/congestion) is provided. Consideration of operations to meet CPS/BAAL control standards, security constrained economic dispatch, and furthermore to accommodate the distributed, renewable generating assets are also provided.

A LFC program or module is a cyclical running program with a generation control cycle time of a few seconds (e.g., 2 seconds, 4 seconds, 6 seconds). According to embodiments, LFC can be enhanced to be able to respond to the islanding conditions and determine the set point for each generating unit within each island to stabilize the islanded operation. ED can also be enhanced to be able to dispatch participating generating units after the islanded operation is under control. RM can also be enhanced to be able to recognize the islands as new control areas and compute the reserves and issue alarms if there are any shortfalls. PCM can also be enhanced to be able to recognize the islands as new control areas and compute the actual production cost statistics and issue alarms if there are significant deviations from optimal solutions. ED executes cyclically with a cycle time of 30 seconds to a few minutes. RM executes cyclically with a cycle time of several seconds to a few minutes. PCM executes cyclically with a cycle time of 30 minutes or an hour.

Figure 1:
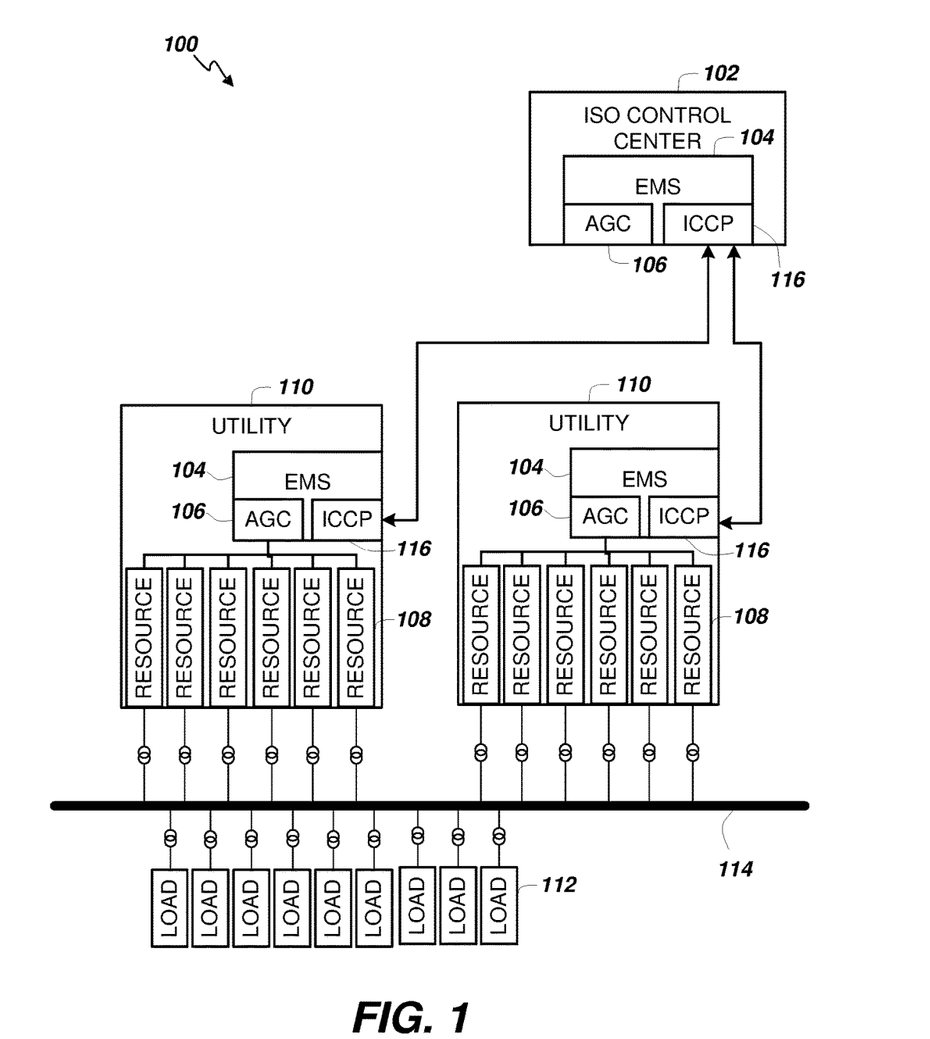
FIG. 1 is a block diagram depicting an example power system according to some embodiments.

Turning now to FIG. 1, an example energy delivery system 100 is illustrated. Independent System Operators (ISO) operate control centers 102 that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity (e.g., loads 112). The generated power is delivered from the resources 108 to consumers via transmission lines 114. Note that the utilities 110 can include an EMS 104 with an AGC system 106. Appropriate transformers, switches, and circuit breakers can be used to allow the resources 108 to be connected and disconnected from the transmission lines 114 on command.

In some embodiments, EMS 104 further includes one or more Utility Communication Servers that each provide an implementation of an Inter-Control Center Communication Protocol (ICCP) 116 that enables communication with, for example, other EMSs in operation at, for example, several utilities 110. In some embodiments, ICCP 116 can be used to implement remote control of resources 108 by implementing AGC system 106 communications between different EMSs. The EMS 104 can also include a communication front end (CFE)/Real Time Data Server (RTDS) to facilitate communications with external entities and users via remote terminal units (RTUs). Note that RTUs can be part of the power utilities' field devices, for example.

Figure 2:
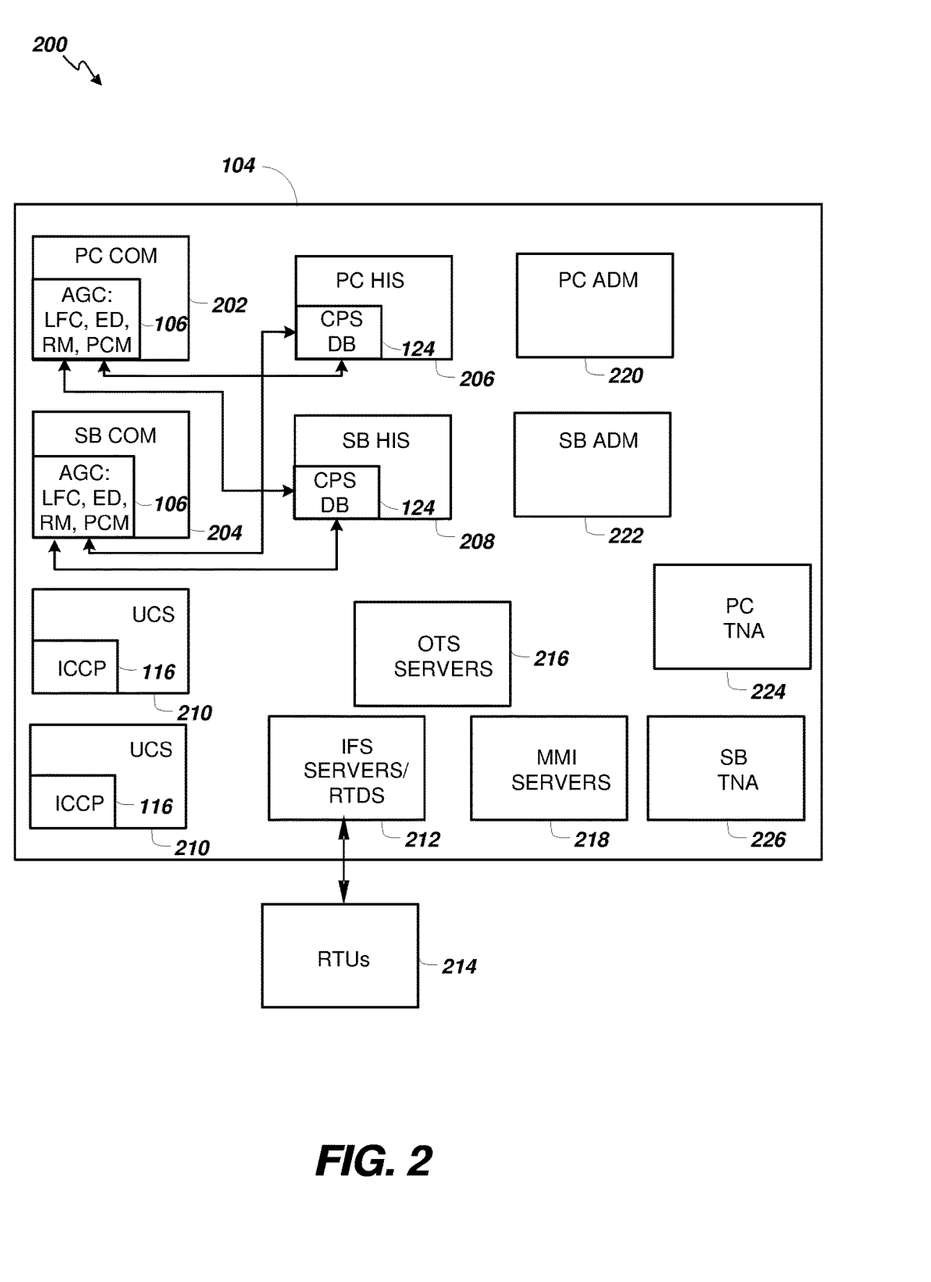
FIG. 2 is a block diagram depicting an example energy management system according to some embodiments.

An example configuration of an EMS 104 that supports the operation of the AGC system 106 applications is illustrated in FIG. 2. The AGC system 106 applications can be implemented within a Process Controller (PC) server 202 that also includes Communicator (COM) functionality. The EMS 104 can include redundant back-up servers to provide higher reliability and fault-tolerance. Thus, a Standby (SB) server 204 is also provided in some embodiments. A PC HIS server 206 that implements a Historical Information System (HIS) and a SB HIS server 208 that implements a backup HIS can also be included in the EMS 104. The lines connecting the PC server 202, the PC HIS server 206, the SB server 204, and the SB HIS server 208 represent data flows between these servers. The PC HIS server 206 includes and executes programs collecting real time AGC data from PC COM for archiving as per archiving requirements. The PC server 202 includes and executes programs that retrieve historical data from the PC HIS server 206 for various purposes, for instance, for CPS (Control Performance Standard) related real time control in AGC (Automatic Generation Control), for WECC (Western Electricity Coordinating Council) time error correction.

In some embodiments, an EMS 104 further includes one or more utility communication servers (UCS) 210 that each provide an implementation of an Inter-Control Center Communication Protocol (ICCP) 116 that enables communication with, for example, an EMS in operation at, for example, a utility 110 (FIG. 1). In some embodiments, ICCP 116 can be used to implement remote control of resources 108 (FIG. 1) by implementing system communications between an ISO control center 102 (FIG. 1) and a utility 110. The EMS 104 can also include an independent front end system (IFS) 212/Real Time Data Server (RTDS) to facilitate communications with external entities and users via remote terminal units (RTUs) 214. In some embodiments, the EMS 104 can also include a number of additional servers and applications. For example, the EMS 104 can include Operator Training Simulator (OTS) servers 216, Man-Machine Interface (MMI) servers 218, a PC Administration (ADM) application server 220, a SB ADM application server 222, a transmission network application (TNA) server 224, and a SB TNA server 226.

As noted above, LFC, ED, RM and PCM have different operation objectives in general and also in the case of system islanding. However, there are some common modules that are shared in processing islanding condition data by each of these applications. The common modules can include an islanding detection application, a recovery detection application, an islanding to recovery progress application, a control area and island records management application, and an island's generation and load management for islands application.

An islanding detection application can make use of transmission network application (TNA) state estimator results and a number of islands are identified with corresponding original control areas (Balancing Authorities). Each island is uniquely assigned to an original control area (Balancing Authority). Each AGC generating unit originally assigned to a control area (Balancing Authority) is additionally assigned to an island.

A recovery detection application can make use of the TNA State Estimator results. If no islands are identified, then the system is entirely recovered. Each AGC generating unit is no longer assigned to an island, but just keeps assigned to its original control area.

An islanding to recovery progress application can help manage AGC generating units' assignments to islands during recovery. As the recovery progresses, the number of islands reduces. Each island is uniquely assigned to an original control area (Balancing Authority). Each AGC generating unit originally assigned to a control area (Balancing Authority) is additionally assigned to an island. An AGC generating unit assigned to an island may get assigned to a different island as the recovery progresses.

A control area and island records management application can be used to maintain records in a system database. Each control area is represented in the system database as a record number of relations AreaV/B—uniquely identified by a TechID (norm element, record number). When an original control area (Balancing Authority) is split into multiple islands, each of these islands is also treated as a control area. In some embodiments, the memory is pre-allocated for a maximum of 15 islands. Additional memory for additional islands can be allocated in other embodiments. When an island is active, a pre-allocated but not yet used record number of AreaV/B is assigned to the island, and the Read/Write flag of that record number is set in the system database so the monitor, dispatch and control results of these islands can be updated to the System database.

An island's generation and load management for islands application can also be provided. As an original control area splits into multiple islands, the total generation capacity and total load for each island are significantly different from their counterparts of the original control area. The maximum upward and downward generation capacities and regulating reserves are all different, and are monitored and allocated appropriately. From normal operation to islanded operation, or from islanded operation to full recovery, or from one islanded operation to another islanded operation, generation and load are monitored, and generation is appropriately controlled and dispatched for the islanded AGC operation.

The Islanded AGC Operation involves making use of a dedicated interface to retrieve all the necessary islanding condition data from the Transmission Network Application (TNA) to the AGC operational database; creating mappings between generating units to islands and islands to control areas (Balancing Authorities); managing AGC real time database records for the islands; monitoring the operation of each island; and controlling and dispatching the generating assets for the desired operation of each island. Further details regarding the common modules used among LFC, ED, RM and PCM are now provided.

Operation of the islanding detection module can involve several steps. The following example steps are provided for illustration purposes. Let the original control areas be represented by $Area_j$ where subscript j represents the jth control area (Balancing Authority, abbreviated as BA) in the system database (DB), which is identical to the record number of the record in the AreaV/B (value/Boolean) relations of the database. Note that record number is the set number of a specific relation in the database. The range of the BA record numbers is from 1 to a configurable number. The internal and external control areas are all modeled. The internal control areas are for AGC control, and the external control areas are just for validating interchange tie flows. These control areas can be modeled in a model management module. Only the internal control areas are subject to islanding.

The layout (i.e., database structure) of the control area record numbers is given in Table I.

TABLE I

Control Area Record numbers Arrangement

| Control Area | Record number Range | Comment |
| --- | --- | --- |
| Internal Control Area | 1 to cMaxIntCA | cMaxIntCA: maximum number of internal control areas. cMaxIntCA is configurable. |
| External Control Area | (cMaxIntCA + 1) to (cMaxIntCA + cMaxExtCA) | cMaxExtCA: maximum number of external control areas. cMaxExtCA is configurable. |
| Islands | (cMaxIntCA + cMaxExtCA + 1) to (cMaxIntCA + cMaxExtCA + cMaxIsland) | cMaxIsland: maximum number of islands. cMaxIsland is configurable. |

The memory block for the maximum number of records for internal control areas, external control areas, and islands are created in the database. A Read/Write flag is set for the islands only when the islands are active. If the Read/Write flag of a record is not set to true, then the data content of that record is not accessible.

AreaV is the relation for values of a control area; AreaB is the relation for Booleans of a control area. For clarity herein, an area record is combination of data values and Boolean flags.

The data retrieved from the TNA is presented in the Table II, which links each generating unit's record number on the unit level (SrcUnitV/B) to an associated island.

TABLE II

Unit to Island Mapping

| Generating Unit | Generating Unit's Record number | Island |
|---|---|---|
| Uni_A1 | 1 | 1 |
| Unit_A2 | 2 | 1 |
| ... | ... | 1 |
| Unit_An | n | 1 |
| Unit_B1 | n + 1 | 2 |
| Unit_B2 | n + 2 | 2 |
| ... | ... | 2 |
| Unit_Bm | n + m | 2 |
| ... | ... | |
| ... | ... | |
| Unit_X | ... | |
| ... | ... | |

Each generating unit is previously assigned to an original control area (Balancing Authority). Combining this preassigned relationship with the relationship between the generating units and the islands, the Table III is obtained.

TABLE III

Unit to Island, Control Area Mapping

| Generating Unit | Generating Unit's Record number | Island | BA Control Area |
|---|---|---|---|
| Unit_A1_ | 1 | 1 | 1 |
| Unit_A2 | 2 | 1 | 1 |
| ... | ... | 1 | 1 |
| Unit_An | n | 1 | 1 |
| Unit_B1 | n + 1 | 2 | 1 |
| Unit_B2 | n + 2 | 2 | 1 |
| ... | ... | 2 | 1 |
| Unit_Bm | n + m | 2 | 1 |
| Unit_C1 | n + m + 1 | 3 | 2 |
| Unit_C2 | n + m + 1 | 3 | 2 |
| ... | ... | 3 | 2 |
| Unit_Cl | n + m + l | 3 | 2 |
| ... | ... | ... | ... |
| ... | ... | ... | ... |
| Unit_X | ... | p | s |
| ... | ... | ... | ... |

As the system becomes islanded, the transmission network has significantly changed, and therefore the penalty factor of each AGC unit is recalculated and passed to the database. The generic mapping of an AGC generating unit to an original BA, and to an island is built and given in Table IV for fast access and convenient indexing.

TABLE IV

Generic Mapping from Unit to Island, Area

| Generating Unit | Penalty Factor | Generating Unit's Record number | Island | BA Control Area | Comment |
|---|---|---|---|---|---|
| Unit_i | Penalty factor number | xx | yy | zz | An AGC generating unit with a record number xx (of relations SrcUnitV/B) is assigned to BA control area with a record number zz, and also assigned to an island with an island index yy. |

As shown in Table V, islands' record numbers of AreaV/B are assigned so the record numbers can be considered as a control area (even though not a Balancing Authority) in the AGC applications. Also, an additional islanded flag is introduced for convenient looping through control areas. In some embodiments, external control areas are not necessarily considered for AGC control. So whether the external control areas are islanded or not, these areas may not be considered in the AGC control logic, and therefore the island number attribute is assigned a value of 0. For an original BA control area, its island number attribute is also assigned 0, indicating this is the original BA control area. For the island turned control area, the island number attribute is assigned a positive integer, which is obtained from the TNA state estimator result. Furthermore, the Reference BA Control Area is introduced to indicate whether the control area of a given record number is truly a BA control area. If the record number is identical to the Reference BA Control Area, then this record number represents one of the original BA control areas.

TABLE V

Control Area record number tracking for BA Control Areas and Islands

| Area (including internal and external control areas and islands) | Record number of AreaV/B | Internal or External | Island Number | Reference BA Control Area | Islanded |
|---|---|---|---|---|---|
| External_1 | 1 | External | 0 | 1 | N |
| External_2 | 2 | External | 0 | 2 | N |
| External_3 | 3 | External | 0 | 3 | N |
| External_4 | 4 | External | 0 | 4 | N |
| External_5 | 5 | External | 0 | 5 | N |
| External_6 | 6 | External | 0 | 6 | N |
| External_7 | 7 | External | 0 | 7 | N |
| EMS_2 | 8 | Internal | 0 | 8 | Y |
| EMS | 9 | Internal | 0 | 9 | Y |
| Island_1 | 10 | Internal | 1 | 9 | Y |
| Island_2 | 11 | Internal | 2 | 9 | Y |
| Island_3 | 12 | Internal | 3 | 9 | Y |
| Island_4 | 13 | Internal | 4 | 9 | Y |
| Island_5 | 14 | Internal | 5 | 9 | Y |
| Island_6 | 15 | Internal | 6 | 9 | Y |
| Island_7 | 16 | Internal | 7 | 9 | Y |
| Island_8 | 17 | Internal | 8 | 9 | Y |
| Island_9 | 18 | Internal | 1 | 8 | Y |
| Island_10 | 19 | Internal | 2 | 8 | Y |
| Island_11 | 20 | Internal | 3 | 8 | Y |

For the island turned control areas, the Read/Write flag of each record is set to true so they can be accessed and updated with control results.

Operation of the recovery detection module can involve several steps. The following example steps are provided for illustration purposes. When the issues that caused the system to island are resolved, the system is recovered and the normal operation is resumed. All the islands will be removed from AGC operation, and the original BA control areas will operate under AGC. Advanced control and dispatch of generating units is applied to avoid inappropriate control and dispatch actions that may cause transmission lines/branches to become overloaded during the recovery process.

The recovery detection module initially obtains the islanding condition data from the TNA State Estimator. With reference to Table II of the Islanding Detection module, if the system is recovered, there will be no records that associate any AGC unit to an island. This causes the system to update Table III of the Islanding Detection module. The island number for each unit will be updated to 0, indicating the unit is not associated with any valid island. These AGC units remain assigned to their respective, original BA control areas.

Table IV of the Islanding Detection module will then be updated with the Islanded flag being set to false for the original BA control areas (e.g., EMS, EMS_2). In addition, for the islands in Table IV, the Islanded flags are all set to false and the Reference BA Control Area set to 0.

For the island turned control areas, the Read/Write flag of each record is then set to false so these records will not be accessible as these islands no longer exist.

Operation of the islanding to recovery progress module can involve several steps. The following example steps are provided for illustration purposes. As the recovery progresses, the number of islands reduces. Each island is uniquely assigned to an original control area (Balancing Authority). Each AGC generating unit originally assigned to a control area (Balancing Authority) is additionally assigned to an island. An AGC generating unit assigned to an island may get assigned to a different island as the recovery progresses.

Based on Table II of the islanding detection module, a unit is assigned to an island. The Island number for each cycle and the previous cycle are recorded at the same time. Together these numbers indicate if an island was just determined (indicating islanding) or has just disappeared (indicating recovery). Table II of the islanding detection module, with some adjustments, is expanded to become Table VI of the islanding to recovery progress module, which indicates three possible scenarios.

If the Island for Current Cycle is positive and the Island for Previous Cycle is 0, this implies that an islanding occurred as in the example of Unit_X.

If the Island for Current Cycle is 0 and the Island for Previous Cycle is positive, this implies that an islanding just disappeared as in the example of Unit_A1.

If the Island for Current Cycle is positive and the Island for Previous Cycle is also positive and different than the Island for Current Cycle, this implies that an islanding is further progressing or a recovery is progressing as in the example of Unit_B1.

TABLE VI

Unit to Island Mapping for Current and Previous Cycles

| Generating Unit | Generating Unit's Record number | Island for Current Cycle | Island for Previous Cycle |
| --- | --- | --- | --- |
| Unit_A1 | 1 | 0 | 1 |
| Unit_A2 | 2 | 0 | 1 |
| ... | ... | 1 | 1 |
| Unit_An | n | 1 | 1 |
| Unit_B1 | n + 1 | 1 | 2 |
| Unit_B2 | n + 2 | 1 | 2 |
| ... | ... | 1 | 2 |
| Unit_Bm | n + m | 1 | 2 |
| ... | ... | | |
| ... | ... | | |
| Unit_X | ... | 1 | 0 |
| ... | ... | | |

If the islanding condition is increasing, implying that more islands are being created, then additional islands will be enabled for AGC control, and the corresponding records will have their Read/Write flag set to true following the same process described above for the Islanding Detection module.

If recovery is under way, implying that the number of islands are being reduced, then those reduced islands will be disabled from AGC control, and the corresponding records will have their Read/Write flag set to false following the same process described above for the Recovery Detection module.

Operation of the control area and island records management module can involve several steps. The following example steps are provided for illustration purposes. Each control area is represented in the system database as a record number of relations AreaV/B, uniquely identified by a TechID (norm element, record number). When an original control area (Balancing Authority) is split into multiple islands, each of these islands is also treated as a control area. In some embodiments, the memory is pre-allocated for a maximum of 15 islands. In other embodiments, additional memory for additional islands can be allocated. When an island is active, a pre-allocated but not yet used record number of AreaV/B is assigned to the island, and the Read/Write flag of that record number is set in the system database so the monitor, dispatch and control results of these islands can be updated to the System database.

In the case of islanding, the control area and island records management module includes identifying those record numbers (of AreaV/B) corresponding to the islands resulting from the original BA control areas splitting and verifying they are not accessible for Read/Write; setting the Read/Write flag to true for the identified record numbers so the results for those record numbers will get updated; and setting the Reference BA control area of these record numbers for islands to respective original BA control areas splitting into those islands.

In the case of recovery, the control area and island records management module includes identifying those record numbers (of AreaV/B) corresponding to the islands resulting from the original BA control areas splitting that no longer exist and verifying they are accessible for Read/Write; setting the Read/Write flag to false for the identified record numbers so these record numbers of AreaV/B will not be accessible; and setting the Reference BA control area of these record numbers for islands to 0, and the Islanded flag to false.

Operation of the Island's Generation and Load Management for Islands module can involve several steps. The following example steps are provided for illustration purposes. As an original control area splits into multiple islands, the total generation capacity and total load for each island are significantly different from their counterparts of the original control area. The maximum upward and downward generation capacities and regulating reserves are all different, and are monitored and allocated appropriately. From normal operation to islanded operation, or from islanded operation to full recovery, or from one islanded operation to another islanded operation, generation and load are monitored, and generation is appropriately controlled and dispatched for the islanded AGC operation.

In the case of islanding, the Island's Generation and Load Management for Islands module identifies the frequency source for each island and uses the frequency source in its Islanded AGC Operation. The generation capacities (minimum and maximum) and ramping capability for each island are calculated. The conforming load and non-conforming load for each island are identified to ensure the loads are met by the island's generation capacity and if necessary, possibly interchange with neighboring islands and/or external control areas by means of emergency schedules. AGC generating units stop following the market dispatch instructions. Each island operates in constant frequency ACE mode, or tie line bias ACE mode if some interchange tie flows are not disconnected. In case of tie-line bias ACE mode, emergency schedules will be applied if so desired by the operator.

In the case of recovery, the island's generation and load management for islands module operates as follows. All the original frequency sources designated for the original BA control areas are to be used in the AGC control of these BA control areas. The generation capacities (minimum and maximum) and ramping capability for the original BA control areas are calculated. The conforming load and non-conforming load for the original BA control areas are identified to ensure they are met by the BA control areas' generation capacity and, if necessary, possibly interchange with neighboring control areas by means of regular schedules. AGC generating units will resume following market dispatch instructions.

Now that the details of the modules common to the system for processing islanding condition data have been described, details of individual AGC application specific modules are provided.

The LFC application includes several modules. In the case of islanding, each island resulting from original BA control areas splitting is treated as a new control area. The new control area will be operated in the constant frequency mode or tie-line bias mode if there are any interchange tie flows active with neighboring islands and/or external control areas. The island AGC control and the units' AGC control are all reset (e.g., blocked and restarted) so the AGC generating units' dispatch no longer follows market instructions and starts from the units' current actual MW.

In the case of transitioning from one island to another island mode, the island AGC control and the unit's AGC control are all reset (e.g., blocked and restarted) so the AGC generating unit's dispatch no longer follows what was determined from a previous network condition and starts from their current actual MW.

In the case of islanding, real-time Control Performance Standards (CPS) control, Balancing Authority ACE Limit (BAAL) control, predictive CPS control, CPS green zone control, Reliability Based Control (RBC) green zone control will all be disabled for all islands and the original BA control areas.

In the case of islanding, the original BA control areas will be taken off AGC control.

In the case of recovery, all islands will be taken off AGC control. The original BA control areas will be placed on AGC control. The area AGC control and the units' AGC unit control are all reset (e.g., blocked and restarted) so the AGC generating units' dispatch will follow the market instructions. The AGC units' basepoint source will be set accordingly. The real-time CPS control, BAAL control, predictive CPS control, CPS green zone control, and RBC green zone control will all be enabled for the original BA control areas.

The ED application includes several modules. In The case of islanding, the AGC generating units' penalty factors are be retrieved from the TNA as the network has had significant changes such that penalty factors are recalculated and the ED application uses the updated values. The ED application calculates the dispatch instructions based on the units' actual MW for each island. The ED application identifies which island has which dispatchable generating units and computes the optimal MW basepoint for them subject to security constraints. The generation to be dispatched is on the island basis.

In the case of recovery, the ED application will not compute dispatch instructions for the islands, but instead compute dispatch instructions for the original BA control areas. These results may not be used depending on the basepoint source of each dispatchable generating unit. The generating unit may choose to receive the dispatch instruction from the market.

The RM application includes several modules. In the case of islanding, the RM application identifies which island has which AGC generating units and computes various reserves for the units. The island-wise reserves are computed and checked against respective island reserve requirements and alarms are issued if there are any shortfalls detected. In case of islanding, the RM application will not calculate reserves for the original BA control areas and monitoring and alarming functionalities are disabled for the original BA control areas.

In the case of recovery, the RM application will not calculate reserves for the islands, and monitoring and alarming functionalities are disabled for the islands. In the case of recovery, the RM application will again compute the reserves for the original BA control areas, and monitoring and alarming functionalities are enabled for the original BA control areas.

The PCM application includes several modules. In the case of islanding, the PCM application identifies which island has which AGC generating units and computes various production cost statistics for them, for corresponding plants, and islands. Appropriate alarms are issued if island actual production cost deviates too much from the ideal production cost. In the case of islanding, the PCM application will not calculate the production cost statistics for the original BA control areas.

In the case of recovery, the PCM application will not calculate the production cost statistics for the islands. In the case of recovery, the PCM application will again compute the production cost statistics for the original BA control areas. Appropriate alarms are issued if area actual production cost deviates too much from the ideal production cost.

The enhanced LFC, ED, RM and PCM applications can utilize a real-time operational database for fast data I/O. In addition to typical frequency measurements, generating unit MW, MVAr measurements, unit limits, unit ramp rates, circuit breaker status, controllability, dispatchability, incremental heat rate curves, incremental water rate curves, and various other pieces of data including fuel data, additional data including generating units assignments to respective islands; generating units assignments to available true time/frequency devices; penalty factors recalculated under islanding conditions; and islands to respective original control areas mapping are used in various embodiments for generation control and dispatch in islanded mode as described above.

The enhanced LFC, ED, RM, PCM applications can each be implemented in two parts. The first part is an application that performs data pre-processing and prepares data in a form that can be accepted by an islanded operation engine, obtains solution results from the islanded operation engine, performs post-processing, and stores the results into the operational database; and the islanded operation engine itself that includes a number of functions/procedures callable from within the applications. The engine receives various input data, carries out designed computational procedures, and saves the solution results into the application supplied output data structures.

Figure 3:
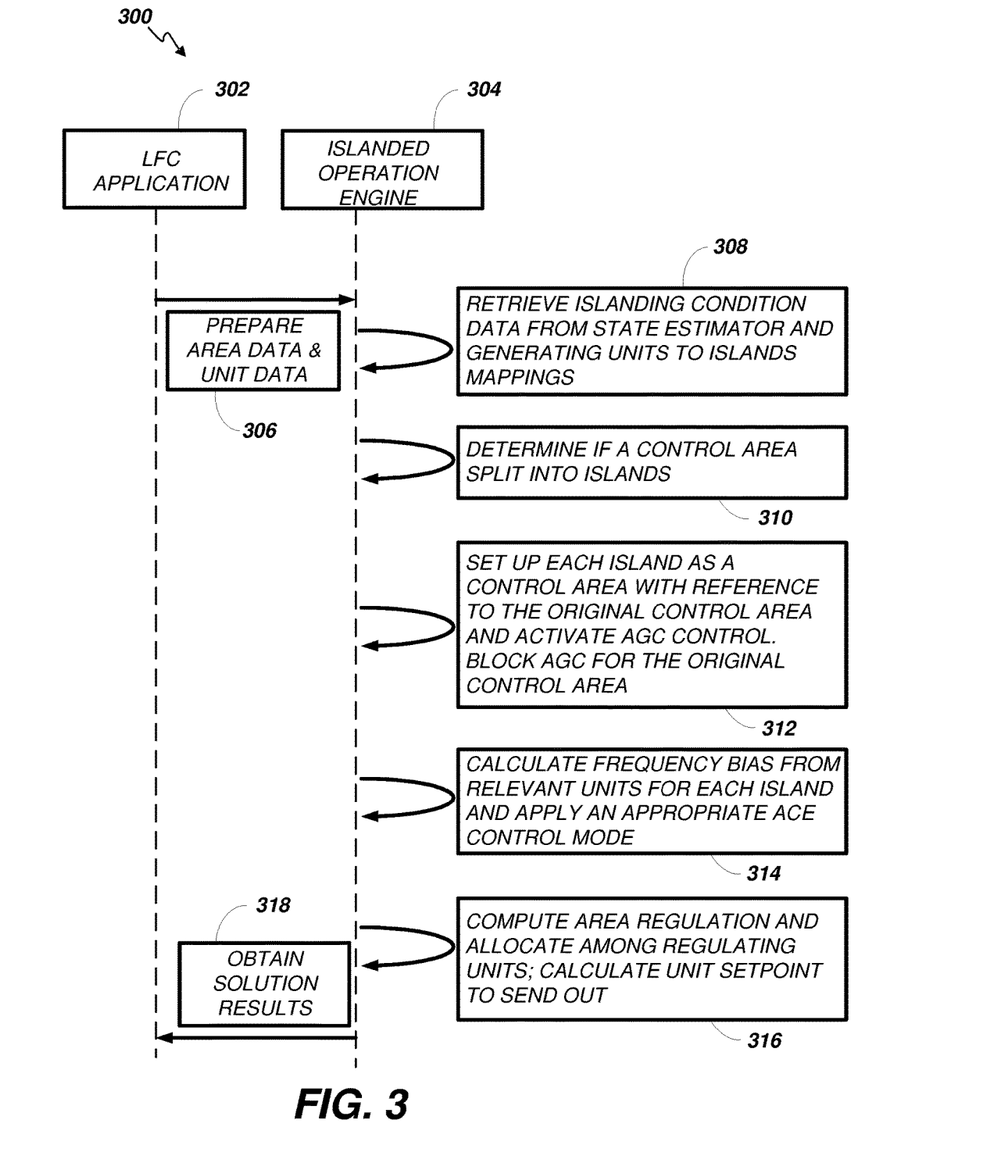
FIG. 3 is a sequence chart illustrating an example load frequency control method according to some embodiments.

FIG. 3 is a sequence chart 300 depicting interaction between a LFC application 302 and an islanded operation engine 304. The LFC application 302 prepares control area data and AGC generating unit data for the islanded operation engine 304 (306). The islanded operation engine 304 then performs the LFC methods described above. For example, islanding condition data is retrieved from the TNA state estimator and generating units to islands mappings are created (308); a determination is made whether a control area has split into islands (310); each island is set up as a control area with reference to the original control area and AGC control of the islands is activated while the AGC is blocked from the original control area (312); frequency bias is calculated from relevant units for each island and an appropriate ACE control mode is applied (314); area regulation is computed, allocated among regulating units, and unit setpoints are calculated to send out (316); and the solution results are populated into LFC application 302 supplied data structures (318).

Figure 4:
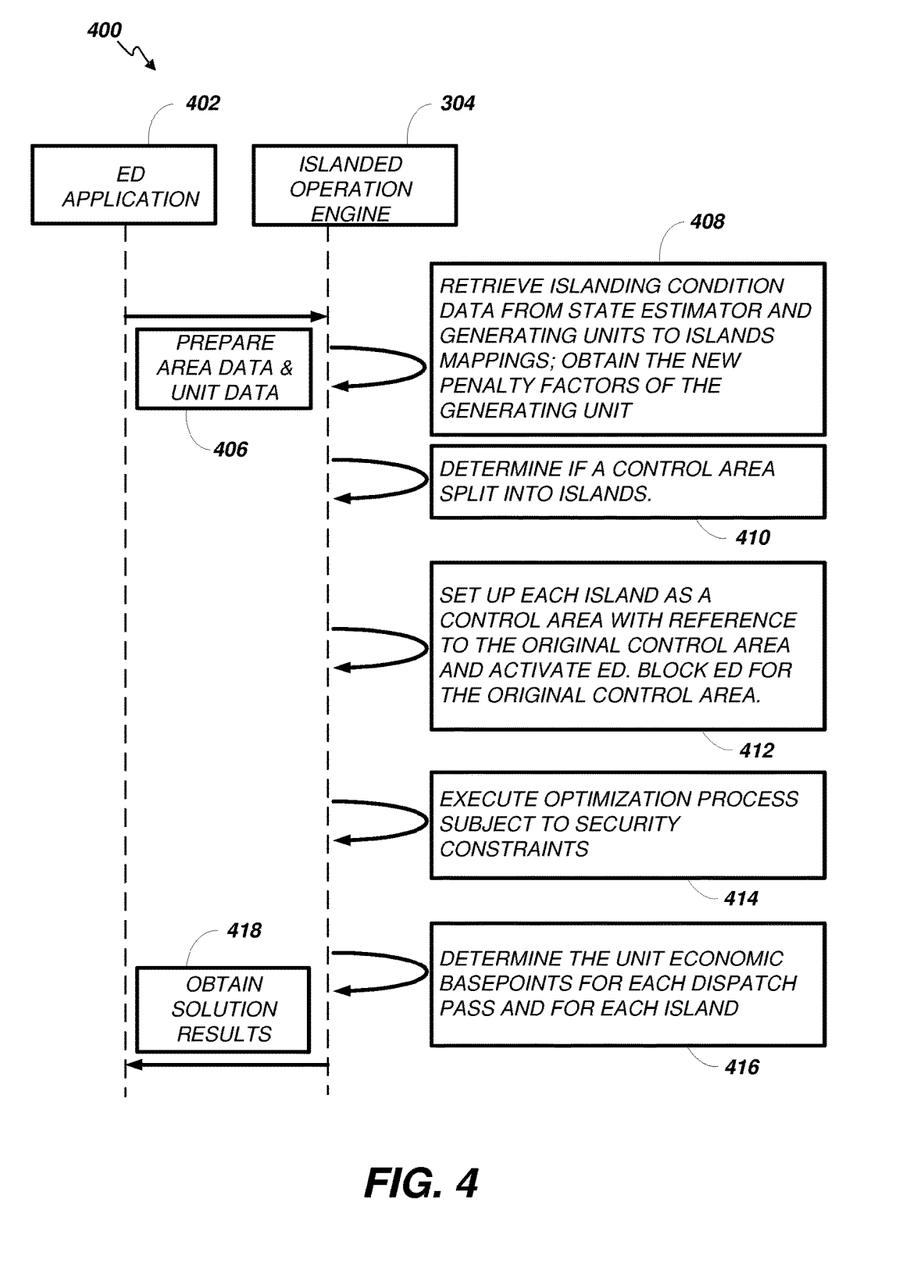
FIG. 4 is a sequence chart illustrating an example economic dispatch method according to some embodiments.

FIG. 4 is a sequence chart 400 depicting interaction between an ED application 402 and the islanded operation engine 304. The ED application 402 prepares control area data and AGC generating unit data for the islanded operation engine 304 (406). The islanded operation engine 304 then performs the ED methods described above. For example, islanding condition data is retrieved from the TNA state estimator, generating units to islands mappings are created, and new penalty factors for the generating units are obtained (408); a determination is made whether a control area has split into islands (410); each island is set up as a control area with reference to the original control area and AGC control of the islands is activated while the AGC is blocked from the original control area (412); an optimization process is executed subject to security constraints (414); unit economic basepoints are determined for each dispatch pass and for each island (416); and the solution results are populated into ED application 402 supplied data structures (418).

Figure 5:
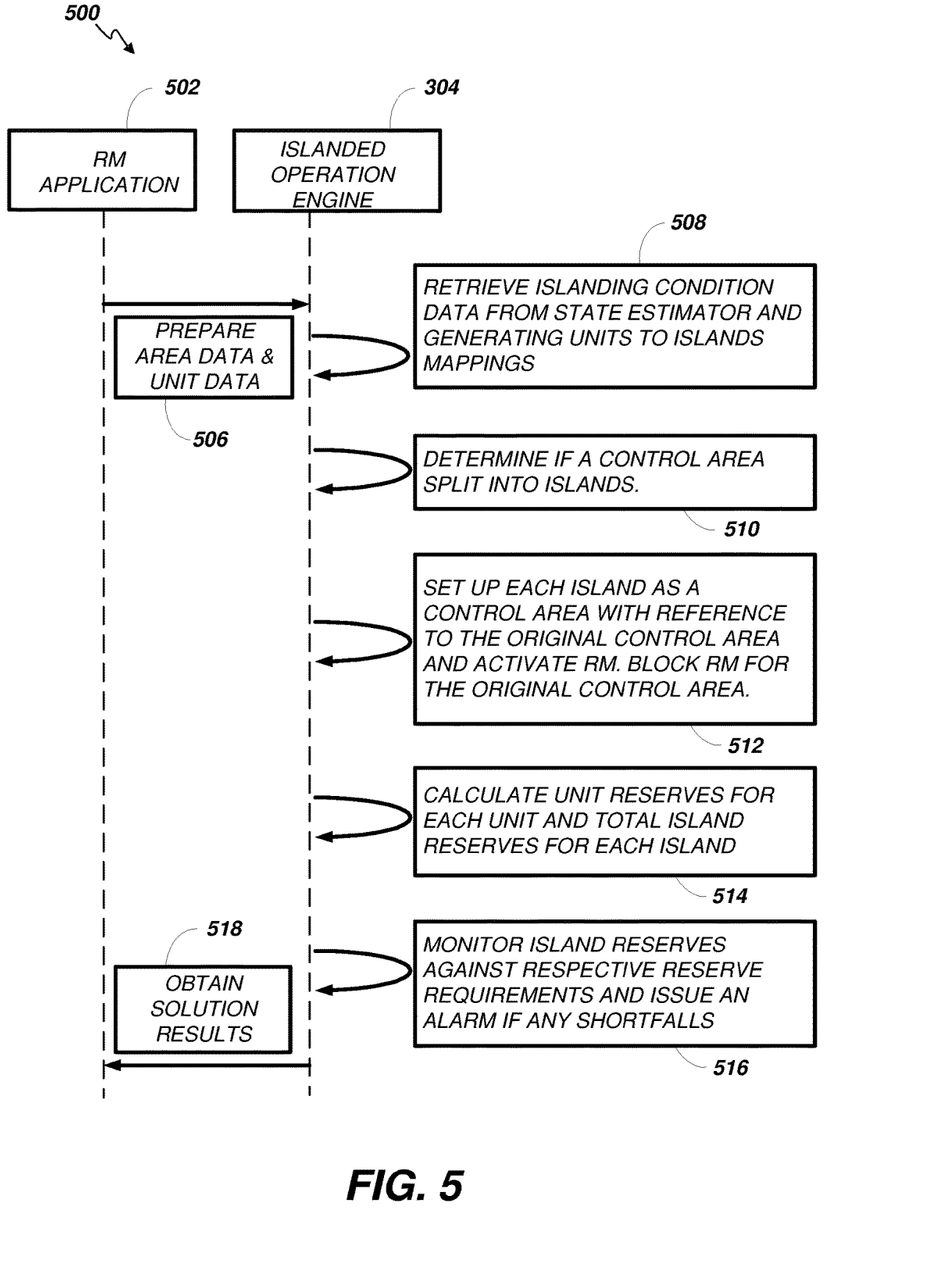
FIG. 5 is a sequence chart illustrating an example reserve monitor method according to some embodiments.

FIG. 5 is a sequence chart 500 depicting interaction between a RM application 502 and an islanded operation engine 304. The RM application 502 prepares control area data and AGC generating unit data for the islanded operation engine 304 (506). The islanded operation engine 304 then performs the RM methods described above. For example, islanding condition data is retrieved from the TNA state estimator and generating units to islands mappings are created (508); a determination is made whether a control area has split into islands (510); each island is set up as a control area with reference to the original control area and AGC control of the islands is activated while the AGC is blocked from the original control area (512); reserves are calculated for each unit and total island reserves are calculated for each island (514); island reserves are monitored against respective reserve requirements and an alarm is issued if there are any significant shortfalls (516); and the solution results are populated into RM supplied data structures (518).

Figure 6:
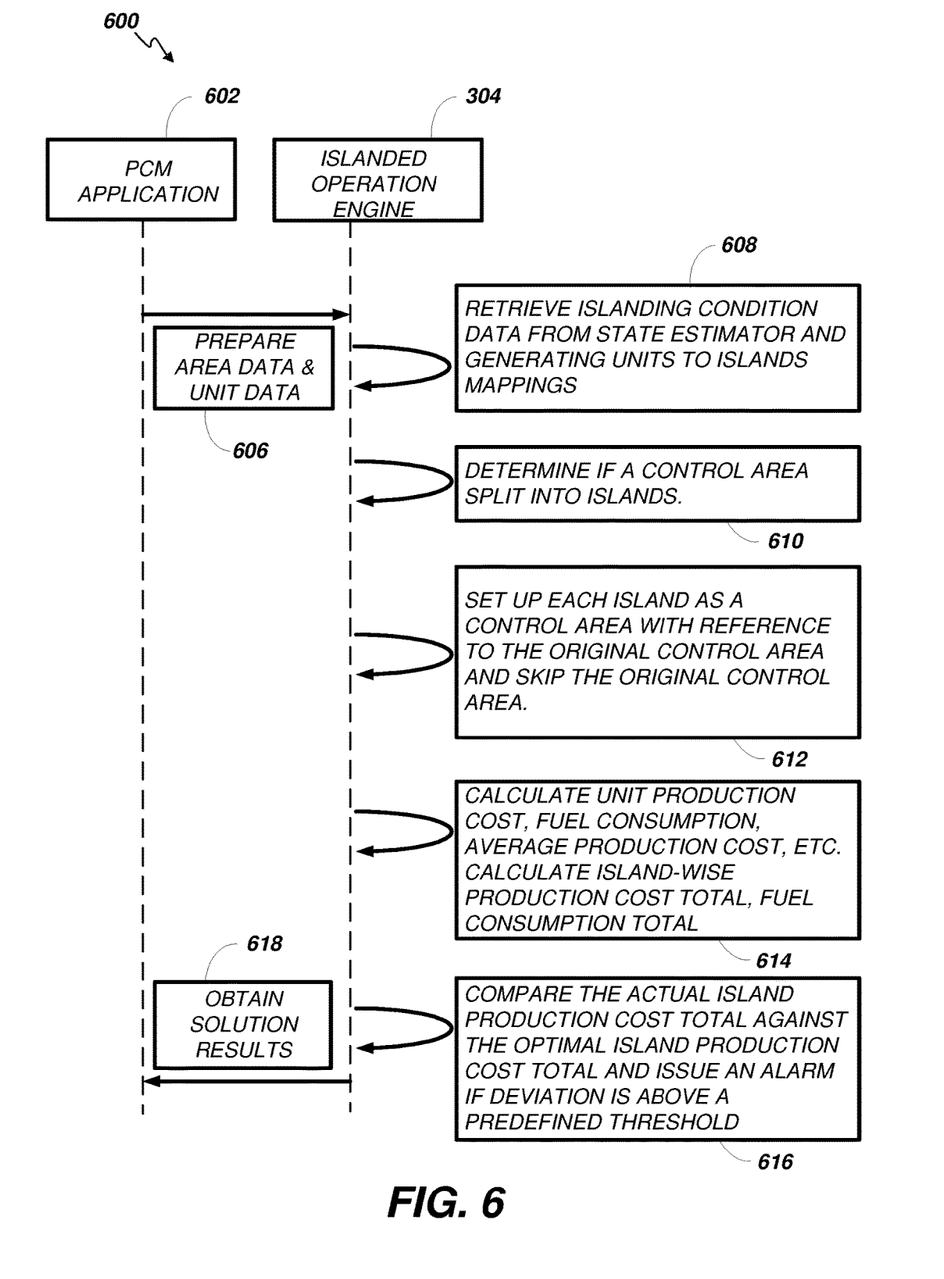
FIG. 6 is a sequence chart illustrating an example production cost monitor method according to some embodiments.

FIG. 6 is a sequence chart 600 depicting interaction between a PCM application 602 and an islanded operation engine 304. The PCM application 602 prepares control area data and AGC generating unit data for the islanded operation engine 304 (606). The islanded operation engine 304 then performs the PCM methods described above. For example, islanding condition data is retrieved from the TNA state estimator and generating units to islands mappings are created (608); a determination is made whether a control area has split into islands (610); each island is set up as a control area with reference to the original control area and the original control area is skipped (612); unit production cost, fuel consumption, average production cost, etc. is calculated for each unit and production cost total, fuel consumption total, etc. is calculated for each island (614); the actual island production cost total is compared against the optimal production cost total, and an alarm is issued if the deviation is above a pre-defined threshold (616); and the solution results are populated into PCM application supplied data structures (618).

Figure 7:
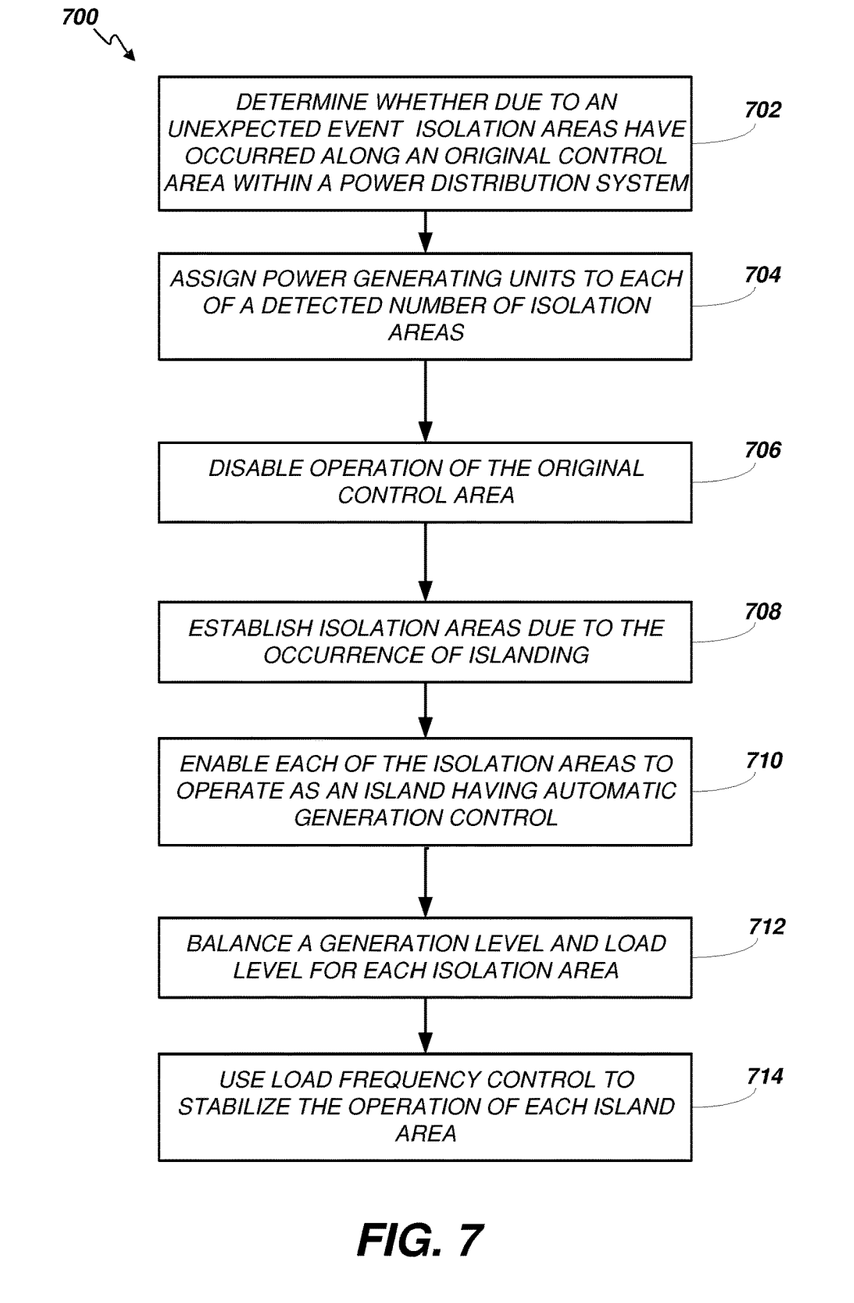
FIG. 7 is a flowchart illustrating an example islanding control method according to some embodiments.

Turning now to FIG. 7, a flowchart depicting an example method 700 according to embodiments is depicted. A determination is initially made whether, e.g., due to an unexpected event, isolation areas have occurred along an original control area within a power distribution system (702). Power generating units are then assigned to each of a detected number of isolation areas (704). Operation of the original control area is then disabled (706). Isolation areas are established due to islanding (708). Each of the isolation areas are enabled to operate as an island having automatic generation control (710). A generation level and load level are balanced for each isolation area (712). Load frequency control is used to stabilize the operation of each isolation area (714). In some embodiments, during recovery in any one of the isolation areas, power generating units may be reassigned to another isolation area.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (CPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A power distribution system comprising:
a plurality of power generating resources operating within a control area;
a plurality of power consuming loads;
a power transmission network coupling the resources to the loads; and
an energy management system in communication with the resources and configured to control operation of the resources within the control area, wherein the energy management system is operative to:
divide the control area into a plurality of isolation areas in response to detecting that isolation areas have occurred within the control area,
assign at least one of the resources to each of the isolation areas,
disable operation of the control area,
enable each of the isolation areas to operate as an island having automatic gain control,
balance a generation level and load level for each isolation area, and
use load frequency control to stabilize operation of each isolation area.

2. The power distribution system of claim 1 wherein the energy management system is further operative to use an economic dispatch application to optimize generation subject to security constraints within each isolation area.

3. The power distribution system of claim 1 wherein the energy management system is further operative to use a reserve management application to determine isolation area reserve totals for each isolation area and to identify any shortfalls based upon isolation area reserve totals and respective isolation area reserve requirements.

4. The power distribution system of claim 1 wherein the energy management system is further operative to use a production cost monitor application to calculate production and fuel cost totals for each isolation area and to identify any deviations above a predefined threshold between actual and optimal island production cost totals.

5. The power distribution system of claim 1 wherein the energy management system is further operative to reassign resources to different isolation areas during recovery.

6. The power distribution system of claim 1 wherein the energy management system further includes a database configured to store data representative of resource assignments to isolation areas and to available frequency devices.

7. The power distribution system of claim 1 wherein the energy management system further includes a database configured to store data representative of penalty factors recalculated for isolation areas and mappings of isolation areas to control areas.

8. A method of automatic generation control within an energy management system, the method comprising:
providing an energy management system in communication with a plurality of power generating resources operating within a control area and configured to control operation of the resources within the control area;
dividing the control area into a plurality of isolation areas in response to detecting that isolation areas have occurred within the control area;
assigning at least one of the resources to each of the isolation areas;
disabling operation of the control area;
enabling each of the isolation areas to operate as an island having automatic gain control;
balancing a generation level and load level for each isolation area; and
using load frequency control to stabilize operation of each isolation area.

9. The method of claim 8 further comprising using an economic dispatch application to optimize generation subject to security constraints within each isolation area.

10. The method of claim 8 further comprising using a reserve management application to determine isolation area reserve totals for each isolation area and identifying any shortfalls based upon isolation area reserve totals and respective isolation area reserve requirements.

11. The method of claim 8 further comprising using a production cost monitor application to calculate production and fuel cost totals for each isolation area and identifying any deviations above a predefined threshold between actual and optimal island production cost totals.

12. The method of claim 8 further comprising reassigning resources to different isolation areas during recovery.

13. The method of claim 8 further comprising storing data representative of resource assignments to isolation areas and to available frequency devices, in a database within the energy management system.

14. The method of claim 8 further comprising storing data representative of penalty factors recalculated for isolation areas and mappings of isolation areas to control areas, in a database within the energy management system.

15. An energy management system comprising:
a processor in communication with a plurality of power generating resources operating within a control area and configured to control operation of the resources within the control area;
a memory storing instructions executable on the processor, the instructions operable to:
divide the control area into a plurality of isolation areas in response to detecting that isolation areas have occurred within the control area,
assign at least one of the resources to each of the isolation areas,
disable operation of the control area,
enable each of the isolation areas to operate as an island having automatic gain control,
balance a generation level and load level for each isolation area, and
use load frequency control to stabilize operation of each isolation area.

16. The energy management system of claim 15 wherein the instructions further include instructions to optimize generation subject to security constraints within each isolation area.

17. The energy management system of claim 15 wherein the instructions further include instructions to determine isolation area reserve totals for each isolation area and to identify any shortfalls based upon isolation area reserve totals and respective isolation area reserve requirements.

18. The energy management system of claim 15 wherein the instructions further include instructions to calculate production and fuel cost totals for each isolation area and to identify any deviations above a predefined threshold between actual and optimal island production cost totals.

19. The energy management system of claim 15 wherein the instructions further include instructions to reassign resources to different isolation areas during recovery.

20. The energy management system of claim 15 wherein the instructions further include instructions to store data representative of resource assignments to isolation areas and to available frequency devices, and to store data representative of penalty factors recalculated for isolation areas and mappings of isolation areas to control areas, in a database within the energy management system.

* * * * *